(12) United States Patent
Umayahara et al.

(10) Patent No.: US 8,999,591 B2
(45) Date of Patent: Apr. 7, 2015

(54) FUEL CELL SYSTEM FOR PREVENTING EXCESSIVE POWER GENERATION

(75) Inventors: Kenji Umayahara, Nishikamo-gun (JP); Takeshi Maenaka, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 81 days.

(21) Appl. No.: 12/808,478

(22) PCT Filed: Dec. 18, 2008

(86) PCT No.: PCT/JP2008/073047
§ 371 (c)(1),
(2), (4) Date: Jun. 16, 2010

(87) PCT Pub. No.: WO2009/078458
PCT Pub. Date: Jun. 25, 2009

(65) Prior Publication Data
US 2011/0111317 A1    May 12, 2011

(30) Foreign Application Priority Data
Dec. 19, 2007   (JP) .................................. 2007-327349

(51) Int. Cl.
*H01M 8/04*   (2006.01)
*H01M 8/10*   (2006.01)

(52) U.S. Cl.
CPC ...... *H01M 8/04246* (2013.01); *H01M 8/04753* (2013.01); *H01M 8/04589* (2013.01); *Y02T 90/32* (2013.01); *Y02E 60/50* (2013.01); *H01M 2008/1095* (2013.01); *H01M 8/04679* (2013.01); *H01M 2250/20* (2013.01); *H01M 8/0494* (2013.01); *H01M 8/04559* (2013.01)

(58) Field of Classification Search
None
See application file for complete search history.

(56) References Cited

U.S. PATENT DOCUMENTS

| | | | | |
|---|---|---|---|---|
| 5,763,113 | A * | 6/1998 | Meltser et al. | 429/432 |
| 6,645,654 | B2 * | 11/2003 | Yagi | 429/413 |
| 2002/0018922 | A1 * | 2/2002 | Fuglevand et al. | 429/22 |
| 2004/0214054 | A1 * | 10/2004 | Shige et al. | 429/13 |
| 2005/0042492 | A1 * | 2/2005 | Kato et al. | 429/34 |
| 2005/0238931 | A1 * | 10/2005 | Maier | 429/13 |
| 2006/0210849 | A1 * | 9/2006 | Bono | 429/22 |

FOREIGN PATENT DOCUMENTS

| | | |
|---|---|---|
| DE | 102005018072 A1 | 12/2005 |
| DE | 112006001469 T5 | 4/2008 |
| EP | 1209023 A2 | 5/2002 |
| JP | 2004-241272 A | 8/2004 |
| JP | 2004-327102 A | 11/2004 |
| JP | 2007005038 A * | 1/2007 |
| JP | 2007-048517 A | 2/2007 |
| WO | 2006/136934 A1 | 12/2006 |

* cited by examiner

*Primary Examiner* — Zachary Best
*Assistant Examiner* — Jennifer Rea
(74) *Attorney, Agent, or Firm* — Kenyon & Kenyon LLP

(57) ABSTRACT

It is possible to prevent excessive power generation of a fuel cell when a failure has occurred. When a start signal is input, a fuel cell system sets an open end voltage of the fuel cell as an initial value of the output voltage of the fuel cell corresponding to the output current zero of the fuel cell. When the failure is detected, the fuel cell system reads out the open end voltage of the preset initial value as the output voltage corresponding to the output current zero and controls the voltage so that the output voltage of the fuel cell coincides with the open end voltage.

2 Claims, 2 Drawing Sheets

… fuel cell system, 20 … fuel cell stack, 30 …

FUEL CELL SYSTEM FOR PREVENTING EXCESSIVE POWER GENERATION

This is a 371 national phase application of PCT/JP2008/073047 filed 18 Dec. 2008, which claims priority to Japanese Patent Application No. 2007-327349 filed 19 Dec. 2007, the contents of which are incorporated herein by reference.

TECHNICAL FIELD

The present invention relates to a fuel cell system which estimates output characteristics of a fuel cell to control a cell operation.

BACKGROUND ART

A fuel cell system is an energy conversion system which supplies a fuel gas and an oxidizing gas to a membrane electrode assembly to cause an electrochemical reaction, thereby converting chemical energy into electric energy. Above all, a solid polymer electrolyte type fuel cell using a solid polymer membrane as an electrolyte can easily be made compact at a low cast, and additionally the fuel cell has a high output density, whereby a use application as a car-mounted power source system is expected.

Output characteristics (current-voltage characteristics) of the fuel cell are not constant, and constantly fluctuate in accordance with a stack temperature, and the flow rate, pressure and humidity of a reactant gas and further in accordance with the fluctuation of an internal resistance due to the variance of water in a polymer electrolyte membrane and the like. Moreover, it is known that the output characteristics fluctuate depending on whether the operation state of the fuel cell is an excessive state or a steady state and that the output characteristics also noticeably fluctuate in accordance with aged deterioration or the like. In such situations, the constantly fluctuating output characteristics need to be grasped so as to appropriately control the operation of the fuel cell. In Japanese Patent Application Laid-Open No. 2004-241272, there is disclosed a method for estimating the output characteristics of the fuel cell based on the output current and output voltage of the fuel cell, to control a cell operation.

[Patent Document 1] Japanese Patent Application Laid-Open No. 2004-241272

DISCLOSURE OF THE INVENTION

Problems to be Solved by the Invention

There is a fuel cell system having a constitution in which when an initial check (the presence/absence of valve breakdown of a hydrogen tank or the like) is performed during start and a failure is detected, failure end processing is performed. In this failure end processing, the fuel cell system controls the output voltage of a fuel cell so that the output current of the fuel cell becomes zero.

However, in a case where the failure is detected by the initial check in such a stage that a cell operation is not started yet, the output characteristics of the fuel cell are not estimated yet, and hence the output voltage of the fuel cell remains at an initial value of zero when the output current of the fuel cell becomes zero. Therefore, the fuel cell system performs control so that the output voltage of the fuel cell becomes a lower-limit voltage during failure processing. In consequence, the output current of the fuel cell is not zeroed, and excessive power generation occurs, whereby the failure processing cannot appropriately be performed.

Therefore, an object of the present invention is to provide a fuel cell system which can prevent excessive power generation of a fuel cell when a failure has occurred.

Means for Solving the Problem

To achieve the above object, a fuel cell system according to the present invention comprises a fuel cell which receives supply of a reactant gas to generate a power; an estimation device which estimates output characteristics of the fuel cell; a control device which controls the operation of the fuel cell based on the output characteristics estimated by the estimation device; and an initial value setting device which sets an open end voltage of the fuel cell as an initial value of the output voltage of the fuel cell corresponding to the output current zero of the fuel cell. On detecting a failure before the operation of the fuel cell, the control device reads out the initial value to set the output voltage of the fuel cell to the open end voltage. Since the open end voltage of the fuel cell is preset as the initial value of the output voltage of the fuel cell corresponding to the output current zero of the fuel cell, it is possible to prevent excessive power generation of the fuel cell when a failure has occurred. The initial value of the output voltage of the fuel cell corresponding to the output current zero of the fuel cell is preferably set before the operation of the fuel cell.

Effect of the Invention

According to the present invention, it is possible to prevent excessive power generation of a fuel cell when a failure has occurred.

DESCRIPTION OF REFERENCE NUMERALS

10 … fuel cell system, 20 … fuel cell stack, 30 … oxidizing gas supply system, 40 … fuel gas supply system, 50 … power system, and 60 … controller.

BEST MODE FOR CARRYING OUT THE INVENTION

Hereinafter, an embodiment according to the present invention will be described with reference to the drawings.

Figure 1:
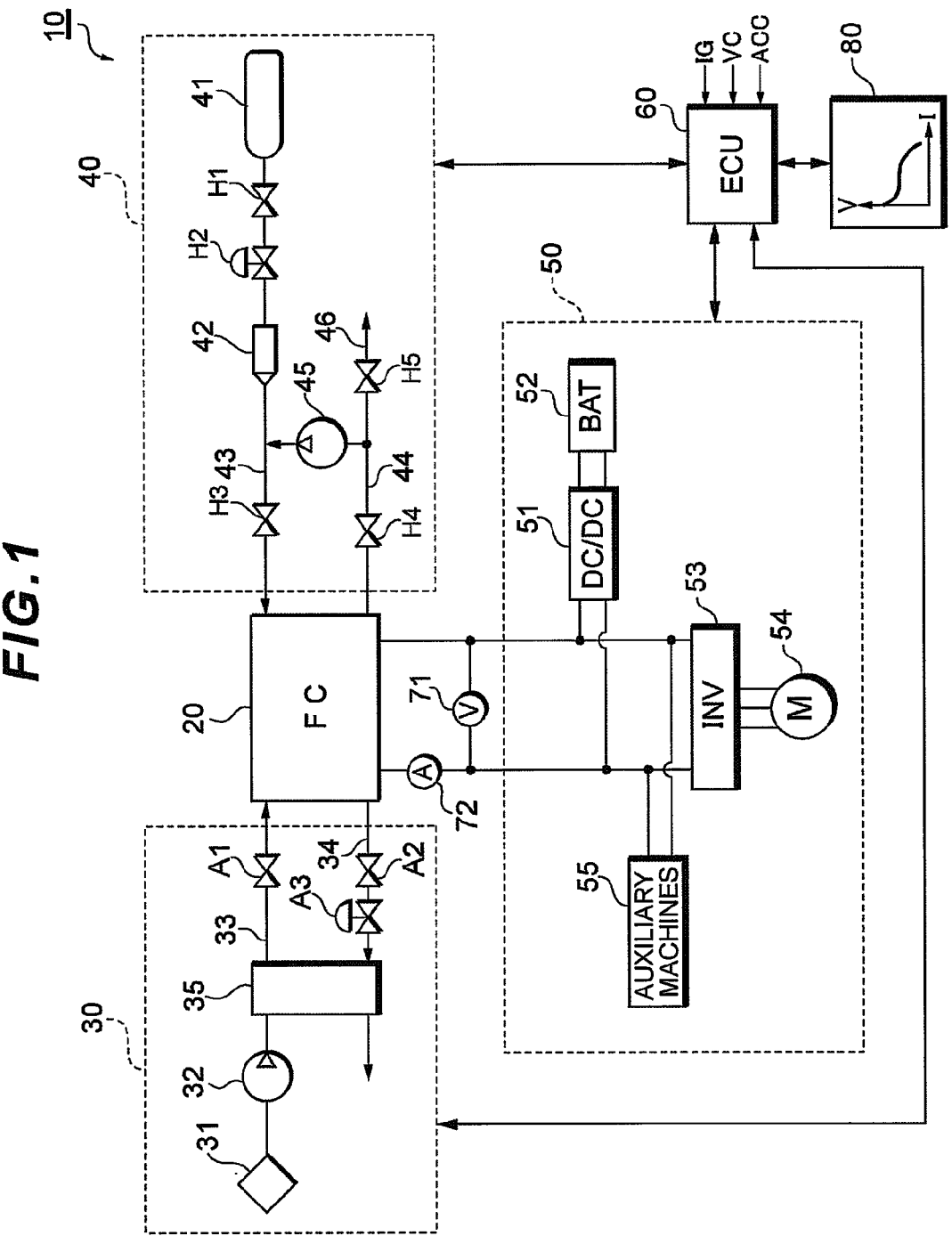
FIG. 1 is a system constitution diagram of a fuel cell system according to the present embodiment.

FIG. 1 shows a system constitution of a fuel cell system 10 which functions as a car-mounted power source system of a fuel cell hybrid vehicle.

The fuel cell system 10 functions as a car-mounted power source system mounted in the fuel cell hybrid vehicle, and comprises a fuel cell stack 20 which receives supply of a reactant gas (a fuel gas, an oxidizing gas) to generate a power; an oxidizing gas supply system 30 which supplies air as the oxidizing gas to the fuel cell stack 20; a fuel gas supply system 40 which supplies a hydrogen gas as the fuel gas to the fuel cell stack 20; a power system 50 which controls the charge/discharge of the power; and a controller 60 which generally controls the whole fuel cell system 10.

The fuel cell stack 20 is a solid polymer electrolyte type cell stack in which a large number of cells are stacked in series. In the fuel cell stack 20, an oxidizing reaction of formula (1) occurs in an anode electrode, and a reducing reaction of formula (2) occurs in a cathode electrode. In the whole fuel cell stack 20, an electromotive reaction of formula (3) occurs.

$$H_2 \to 2H^+ + 2e^- \qquad (1)$$

$$(1/2)O_2 + 2H^+ + 2e^- \to H_2O \qquad (2)$$

$$H_2 + (1/2)O_2 \to H_2O \qquad (3)$$

To the fuel cell stack 20, a voltage sensor 71 for detecting the output voltage of the fuel cell stack 20 and a current sensor 72 for detecting the output current thereof are attached.

The oxidizing gas supply system 30 has an oxidizing gas flow path 33 through which the oxidizing gas to be supplied to the cathode electrode of the fuel cell stack 20 flows, and an oxidizing off-gas flow path 34 through which an oxidizing off-gas discharged from the fuel cell stack 20 flows. The oxidizing gas flow path 33 is provided with an air compressor 32 which takes the oxidizing gas from the atmosphere through a filter 31; a humidifier 35 which humidifies the oxidizing gas pressurized by the air compressor 32; and a shutoff valve A1 which shuts off the supply of the oxidizing gas to the fuel cell stack 20. The oxidizing off-gas flow path 34 is provided with a shutoff valve A2 which shuts off the discharge of the oxidizing off-gas from the fuel cell stack 20; a back-pressure regulator A3 which regulates the supply pressure of the oxidizing gas; and the humidifier 35 which performs water exchange between the oxidizing gas (a dry gas) and the oxidizing off-gas (a wet gas).

The fuel gas supply system 40 has a fuel gas supply source 41; a fuel gas flow path 43 through which the fuel gas to be supplied from the fuel gas supply source 41 to the anode electrode of the fuel cell stack 20 flows; a circulation flow path 44 which returns, to the fuel gas flow path 43, a fuel off-gas discharged from the fuel cell stack 20; a circulation pump 45 which forwards under pressure the fuel off-gas in the circulation flow path 44 to the fuel gas flow path 43; and a gas/water discharge flow path 46 branched/connected to the circulation flow path 44.

The fuel gas supply source 41 is constituted of, for example, a high pressure hydrogen tank, a hydrogen storing alloy or the like, and stores the hydrogen gas having a high pressure (e.g., from 35 MPa to 70 MPa). When a shutoff valve H1 is opened, the fuel gas flows from the fuel gas supply source 41 to the fuel gas flow path 43. The pressure of the fuel gas is decreased to, for example, about 200 kPa by a regulator H2 or an injector 42, whereby the fuel gas is supplied to the fuel cell stack 20.

It is to be noted that the fuel gas supply source 41 may be constituted of a reformer which forms a hydrogen-rich reforming gas from a hydrocarbon-based fuel, and a high pressure gas tank in which the reforming gas formed by this reformer is brought into a high pressure state to accumulate the pressure.

The fuel gas flow path 43 is provided with the shutoff valve H1 for shutting off or allowing the supply of the fuel gas from the fuel gas supply source 41; the regulator H2 for regulating the pressure of the fuel gas; the injector 42 for controlling the amount of the fuel gas to be supplied to the fuel cell stack 20; and a shutoff valve H3 for shutting off the supply of the fuel gas to the fuel cell stack 20.

The circulation flow path 44 is connected to a shutoff valve H4 for shutting off the discharge of the fuel off-gas from the fuel cell stack 20, and the gas/water discharge flow path 46 branched from the circulation flow path 44. The gas/water discharge flow path 46 is provided with a gas/water discharge valve H5. The gas/water discharge valve H5 operates in accordance with a command from the controller 60, to discharge, to the outside, the fuel off-gas including impurities and water in the circulation flow path 44. When the gas/water discharge valve H5 is opened, the concentration of the impurities in the fuel off-gas of the circulation flow path 44 lowers, and the concentration of hydrogen in the fuel off-gas circulating through the circulation system can be raised.

The fuel off-gas discharged through the gas/water discharge valve H5 is mixed with the oxidizing off-gas flowing through the oxidizing off-gas flow path 34, and is diluted by a diluter (not shown). The circulation pump 45 circulates and supplies the fuel off-gas in the circulation system to the fuel cell stack 20 by motor driving.

The power system 50 comprises a DC/DC converter 51, a battery 52, a traction inverter 53, a traction motor 54 and auxiliary machines 55. The fuel cell system 10 has a constitution of a parallel hybrid system in which the DC/DC converter 51 and the traction inverter 53 are connected in parallel with the fuel cell stack 20. The DC/DC converter 51 has a function of raising a direct-current voltage supplied from the battery 52 to output the voltage to the traction inverter 53, and a function of lowering the direct-current power generated by the fuel cell stack 20 or a regenerative power collected by the traction motor 54 by regenerative braking to charge the power into the battery 52. By these functions of the DC/DC converter 51, the charge/discharge of the battery 52 is controlled. Moreover, when the DC/DC converter 51 performs voltage conversion control, the operation point (the output voltage, the output current) of the fuel cell stack 20 is controlled.

The battery 52 functions as a storage source of a surplus power, a regenerative energy storage source during the regenerative braking, and an energy buffer during load fluctuation accompanying the acceleration or deceleration of the fuel cell hybrid vehicle. Preferable examples of the battery 52 include a nickel/cadmium accumulator, a nickel/hydrogen accumulator, and a secondary battery such as a lithium secondary battery.

The traction inverter 53 is, for example, a PWM inverter driven by a pulse width modulation system, and converts the direct-current voltage output from the fuel cell stack 20 or the battery 52 into a three-phase alternate-current voltage to control the rotation torque of the traction motor 54 in accordance with a control command from the controller 60. The traction motor 54 is, for example, a three-phase alternate-current motor, and constitutes a power source of the fuel cell hybrid vehicle.

The auxiliary machines 55 generically refer to motors disposed in parts of the fuel cell system 10 (e.g., power sources for pumps or the like), inverters for driving these motors, and various types of car-mounted auxiliary machines (e.g., an air compressor, an injector, a cooling water circulation pump, a radiator, etc.).

The controller 60 is a computer system comprising a CPU, an ROM, an RAM and an input/output interface, and controls the respective parts of the fuel cell system 10. For example, on receiving an electromotive signal IG output from an ignition switch, the controller 60 starts the operation of the fuel cell system 10, and obtains a demanded power of the whole system based on an accelerator pedal open degree signal ACC output from an accelerator pedal sensor, a vehicle speed signal VC output from a vehicle speed sensor and the like. The demanded power of the whole system is a total value of a vehicle running power and an auxiliary machine power.

Here, the auxiliary machine power includes a power consumed by the car-mounted auxiliary machines (a humidifier, an air compressor, a hydrogen pump, a cooling water circulation pump, etc.), a power consumed by devices necessary for vehicle running (a transmission, a wheel control device, a steering device, a suspension device, etc.), a power consumed by devices (an air conditioning device, a lighting apparatus, an audio, etc.) disposed in a passenger space and the like.

Moreover, the controller 60 determines distribution of the output powers of the fuel cell stack 20 and the battery 52, controls the oxidizing gas supply system 30 and the fuel gas supply system 40 based on an output characteristic map (an I-V characteristic map) 80 of the fuel cell stack 20 so that the amount of the power generated by the fuel cell stack 20 coincides with a target power, and controls the DC/DC converter 51 to regulate the output voltage of the fuel cell stack 20, thereby controlling the operation point (the output voltage, the output current) of the fuel cell stack 20. Furthermore, to obtain a target torque corresponding to the open degree of the accelerator pedal, the controller 60 outputs, to the traction inverter 53, for example, alternate-current voltage command values of U-phase, V-phase and W-phase as switching commands, and controls the output torque and rotation number of the traction motor 54.

Figure 2:
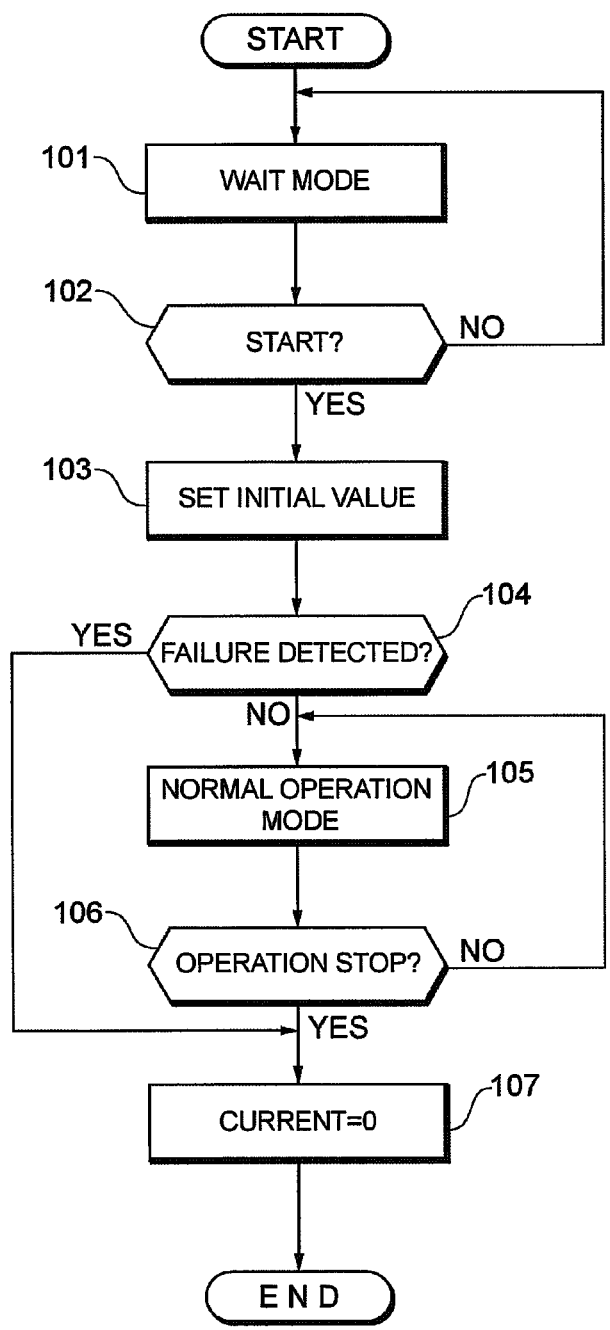
FIG. 2 is a flow chart showing operation control processing of the fuel cell system according to the present embodiment.

FIG. 2 is a flow chart showing operation control processing according to the fuel cell system 10.

The controller 60 is first in a wait mode (step 101). This wait mode continues while the start signal IG is off (step 102: NO). On the other hand, when the start signal IG turns on (the step 102; YES), the controller 60 sets the initial value of the output characteristic map 80 of the fuel cell stack 20 (step 103). When this initial value is set, an open end voltage (OCV) is set as the output voltage corresponding to the output current zero of the fuel cell stack 20.

Next, the controller 60 performs an initial check to inspect the presence/absence of a failure (step 104). Examples of inspection items of the initial check include hydrogen leakage of the fuel gas supply system 40, the presence/absence of the breakdown of the shutoff valve H1 and other troubles which might disturb a safe cell operation. When any failure is not detected in the initial check (the step 104; NO), the controller 60 shifts to a normal operation mode (step 105). In the normal operation mode, the controller 60 acquires the output current and output voltage of the fuel cell stack 20 for each predetermined calculation cycle, and successively updates the output characteristic map 80 of the fuel cell stack 20. For example, the controller 60 can presume that the voltage of the fuel cell stack 20 can be represented by the function of a current (a direct function or predetermined multiple functions), and can prepare the output characteristic map 80 by use of an estimation method such as a least square method.

The controller 60 controls the operation of the fuel cell stack 20 based on the output characteristic map 80 obtained in this manner. The normal operation mode is continued on a condition that the start signal IG is turned on (step 106; NO). Moreover, the output characteristic map 80 continues to be updated for each predetermined calculation cycle in the period of the normal operation mode.

On the other hand, when the start signal IG turns off (the step 106: YES), the controller 60 reads out a voltage $V_0$ corresponding to the output current zero of the fuel cell stack 20 from the output characteristic map 80, and outputs a control command to the DC/DC converter 51 so that the output voltage of the fuel cell stack 20 coincides with the voltage $V_0$ (step 107).

Moreover, when the failure is detected in the initial check (the step 104; YES), the controller 60 reads out the open end voltage of the preset initial value as the output voltage corresponding to the output current zero, and outputs the control command to the DC/DC converter 51 so that the output voltage of the fuel cell stack 20 coincides with the open end voltage (the step 107). The fuel cell system 10 stops its cell operation through the above processing.

According to the present embodiment, as the initial value of the output voltage of the fuel cell stack 20 corresponding to the output current zero of the fuel cell stack 20, the open end voltage of the fuel cell stack 20 is preset before the start of the cell operation, whereby it is possible to prevent excessive power generation of the fuel cell stack 20 when a failure has occurred.

The invention claimed is:

1. A fuel cell system comprising:
a fuel cell configured to receive supply of a fuel gas and an oxidizing gas to generate a power;
a fuel gas supply system having a fuel gas supply source configured to supply the fuel gas to the fuel cell and a shutoff valve configured to shut off the outflow of the fuel gas from the fuel gas supply source;
an estimation device programmed to estimate current-voltage characteristics of the fuel cell based on the output current and output voltage of the fuel cell, wherein the current-voltage characteristics of the fuel cell are updated during a normal operation mode;
a control device programmed to control the power generation of the fuel cell based on the output characteristics estimated by the estimation device; and
an initial value setting device programmed to set an open end voltage of the fuel cell as an initial value of the output voltage of the fuel cell corresponding to the output current zero of the fuel cell before the power generation of the fuel cell,
wherein the estimation device is programmed to estimate that the output voltage of the fuel cell is zero when the output current of the fuel cell is zero, and
wherein on detecting a fuel gas leakage of the fuel gas supply system or breakdown of the shutoff valve before the power generation of the fuel cell, the control device is programmed to read out the initial value to control the power generation of the fuel cell so that the output voltage of the fuel cell is equal to the open end voltage set by the initial value setting device instead of zero estimated by the estimation device.

2. A method comprising:
estimating, by an estimation device, current-voltage characteristics of a fuel cell based on an output current and output voltage of the fuel cell, wherein the estimation device is programmed to estimate that the output voltage of the fuel cell is zero when the output current of the fuel cell is zero, and wherein the current-voltage characteristics of the fuel cell are updated during a normal operation mode;
controlling, by a control device, power generation of the fuel cell based on the output characteristics estimated by the estimation device;
setting an open end voltage of the fuel cell as an initial value of the output voltage of the fuel cell corresponding to the output current zero of the fuel cell before the power generation of the fuel cell; and
on detecting a fuel gas leakage of a fuel gas supply system or breakdown of a shutoff valve for a fuel gas supply source before the power generation of the fuel cell, reading out the initial value to control the power generation of the fuel cell so that the output voltage of the fuel cell is equal to the open end voltage set by the initial value setting device instead of zero estimated by the estimation device.

* * * * *